United States Patent [19]

Barzen

[11] Patent Number: 4,467,269
[45] Date of Patent: Aug. 21, 1984

[54] START-UP CIRCUIT FOR NEGATIVE INDUCTANCE MULTIPLIER

[75] Inventor: Thomas J. Barzen, Addison, Ill.

[73] Assignee: GTE Automatic Electric Inc., Northlake, Ill.

[21] Appl. No.: 436,870

[22] Filed: Oct. 26, 1982

[51] Int. Cl.³ .................... H01F 27/42; H01F 40/14
[52] U.S. Cl. .................................. 323/356; 323/901; 179/170 G
[58] Field of Search ............... 323/305, 355–359, 323/901; 179/18 F, 18 FA, 170 J, 170 G, 174, 175.31

[56] References Cited

U.S. PATENT DOCUMENTS

| | | | |
|---|---|---|---|
| 3,684,975 | 8/1972 | Valfre | 179/170 G |
| 3,881,149 | 4/1975 | Kiko | 323/356 |
| 4,027,118 | 5/1977 | Poppe | 179/170 G |
| 4,096,363 | 6/1978 | Earp | 179/18 FA |

OTHER PUBLICATIONS

G. Orengo & M. Ferry, "DC Flux Compensating Circuit for Reducing the Size of Transformers", IBM Technical Disclosure Bulletin, vol. 21, No. 1, Jun. 1978, pp. 223–224.

Primary Examiner—Peter S. Wong
Attorney, Agent, or Firm—Charles A. Doktycz; Peter Xiarhos

[57] ABSTRACT

A circuit for increasing the inductance of a transformer as used in a telephone line circuit. An operational amplifier with appropriate feedback is connected across a separate winding of the transformer to provide the reactive inductance. To compensate for changes in resistance of the winding, a field effect transistor is controlled by the same amplifier output to provide a positive resistance in the feedback path and thus maintain balance. An operational amplifier and diode are arranged to cooperate with the negative inductor to prevent lock-up.

5 Claims, 1 Drawing Figure

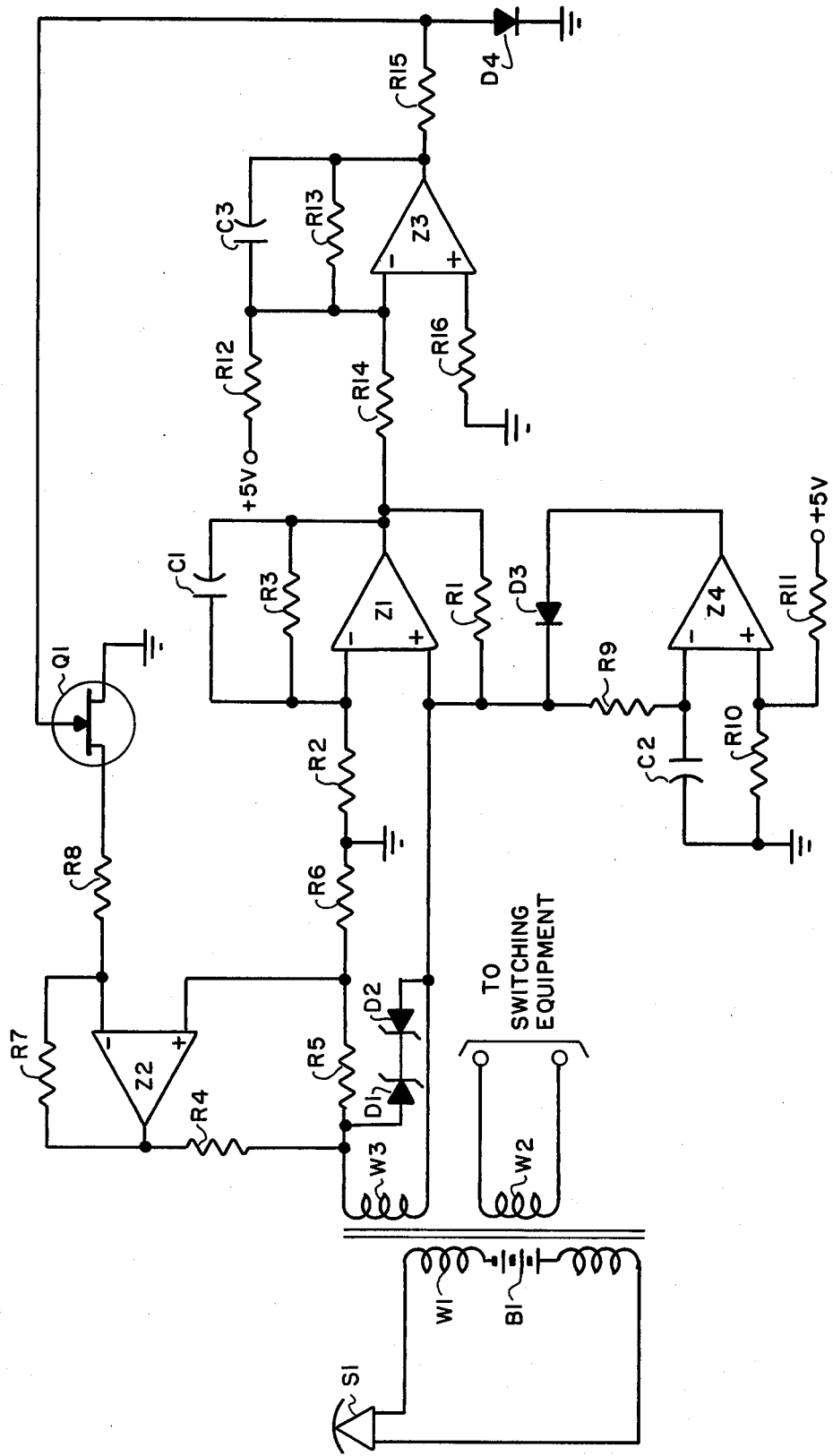

START-UP CIRCUIT FOR NEGATIVE INDUCTANCE MULTIPLIER

CROSS REFERENCES TO RELATED APPLICATIONS

Patent application Ser. No. 436,874 entitled "Negative Inductance Multiplier Circuit Including Temperature Compensation" in the names of Frederick J. Kiko and Thomas J. Barzen has been filed concurrently herewith on related subject matter and assigned to the same assignee as the present invention.

BACKGROUND OF THE INVENTION (1) Field of the Invention:

This invention relates to a circuit for increasing the inductance of a transformer. More particularly the invention relates to a stable inductance multiplier for use with a line circuit battery feed inductor including an arrangement for compensating for resistance changes of said inductor and also includes an arrangement for preventing lock-up.

(2) Background Art:

Battery feed for a telephone traditionally has been supplied through split transformer windings coupled by a DC blocking midpoint capacitor. Because the split windings must carry significantly large DC currents the core of the transformer must be fairly large to keep it from saturating. This technique of supplying battery works very well particularly because of the large degree of transient protection afforded between transformer windings. The major drawback lies in the large physical size and expense of the transformer.

One method used to reduce the size of the transformer is to multiply its inductance by placing an electronically simulated negative inductor in parallel with a tertiary winding. This technique allows the initial premultiplied inductance of the transformer to be considerably smaller. Thus, fewer turns passing a direct current are required and a smaller transformer can be used. The electronic negative inductor is easily protected from high voltage transients because its only coupling to the line side of the transformer is inductive.

The use of an op-amp circuit to simulate an electronic negative inductor which is placed in parallel with a transformer tertiary winding to increase the inductance seen looking into all the other windings has the problem of stability. The op-amp circuit has an input impedance equivalent to a negative inductor in series with a negative resistor. In order to guarantee circuit stability no matter what impedance is connected to the line side of the transformer the loop containing the negative resistor and negative inductor has to be compensated for with a positive resistance. This positive resistor has to be exactly equal to the simulated negative resistor. If this is accomplished the circuit will not oscillate and it also will not load down the input impedance seen looking into the other transformer windings. However, this positive resistance includes the non-zero resistance of the tertiary winding. This coil resistance varies greatly with temperature because of the extremely large temperature co-efficient of cooper. Also if the positive resistance becomes greater than the negative resistance at DC the op-amp circuit will latch up at either the positive or negative rail. Thus trying to match the positive and negative resistance with a factory tuned potentiometer is impractical since if the temperature of the transformer increased, its winding resistance would increase and the negative inductor would latch up.

SUMMARY OF THE INVENTION

Accordingly, in order to assure stability and prevent latch up, a dynamic controllable positive resistor is used in the tertiary winding circuit of the transformer. This is accomplished by using a JFET and varying its drain to source resistance with a control voltage on its gate. This control voltage is taken as the DC level of the output of the op-amp realizing the negative inductor. In order to extract the DC level from any signal present at the op-amp's output a large time constant R-C filter is used. A single pole filter is the best roll-off that can be used because the circuit cannot withstand more than 90 degrees of phase shift without breaking into oscillation. An op-amp non-inverting amplifier is used with the voltage controlled resistor JFET to reduce both the AC and DC signal levels appearing on the drain of the JFET. The signal that would have appeared on the drain of the JFET is first resistor divided down then applied to the JFET and then multiplied back up by the noninverting amplifier and applied to one side of a resistor. By controlling the voltage on one lead of this resistor the effective resistance looking into the other lead can be controlled.

When power is applied to the circuit, initially the resistance of the voltage controlled resistor is too high and the negative inductor op-amp will begin to run toward either the positive or negative supply rail. A third op-amp circuit senses and filters the voltage level at the negative inductor op-amp's non-inverting input. If this voltage is below 0.3 volts this clipping circuit forward biases a diode and forces the voltage at this node to rise to 0.3 volts. This guarantees that the negative inductor op-amp runs toward the positive rail. Before the voltage at the output of the negative inductor op-amp is applied to the gate of the JFET transistor it is run through a fourth op-amp inverting summing amplifier circuit. This signal inversion is necessary to allow use of an N-channel JFET transistor in the voltage controlled resistor circuit. The inverting summing amplifier is also used to filter the signal and shift its level before it is applied to the gate of the JFET transistor. When the voltage on the gate of the JFET transistor reaches a value that causes the voltage controlled resistor to match the negative resistor, the negative inductor op-amp stops running towards the supply rail and sits at this point. In this way the quiescent operating point of the circuit is precisely at the threshold of DC instability.

The voltage levels on the drain of the JFET transistor must be kept low to keep the drain to source resistance of the device equal for AC and DC to guarantee stability and low distortion. These low signal levels require the op-amp used in the voltage controlled resistor to have low offset voltage to keep the error between AC and DC input resistance to a minimum. Commercially available op-amps can be obtained inexpensively with offset voltages down to 1 or 2 millivolts. This error coupled with the non-ideal functioning of the JFET transistor puts a limit on the maximum inductance multiplier practical of about a factor of 5 to 6.

Lightning protection for the circuit is provided by two zener diodes arranged across the tertiary winding such that under normal signal levels one is always reverse biased and non-conducting. Finally a germanium diode shorts the gate of the JFET to ground if the control voltage ever goes positive. A germanium diode will forward bias before a silicon diode and thus the possibility of any forward biased P-N junction effects occuring in the JFET is eliminated.

BRIEF DESCRIPTION OF THE DRAWING

The structure and operation of this invention may be better understood from the following description when considered along with the single FIGURE of the drawing illustrating the invention in a circuit schematic diagram.

DESCRIPTION OF THE PREFERRED EMBODIMENT

FIG. 1 is a schematic diagram showing the negative inductor circuit and how it connects to the tertiary winding of a transformer. It is there shown for a particular feed and audio coupling path to the tip and ring leads of a telephone line. Obviously the component values are not shown and could be made to work as an inductance multiplier on any transformer.

Referring again to FIG. 1, the input impedance seen looking into the non-inverting terminal of the operational amplifier Z1 is $-(R1 \cdot R2 \cdot C1)$ S-R1 R2/R3 or equivalent to a negative inductor of $-R1 \cdot R2 \cdot C1$ henries in series with a negative resistor of $R1 \cdot R2/R3$ ohms. These synthetic elements appear in parallel with the resistance and inductance of the tertiary winding and the input resistance of the voltage controlled resistor realized in FIG. 1 by the operational amplifier Z2, resistors R4 through R8, and JFET transistor Q1. In order to guarantee circuit stability the sum of the resistances must equal 0. Assuring that this condition is met is the function of the voltage controlled resistor.

The information needed for control of the voltage controlled resistor is contained in the DC level of the output of op-amp Z1. Before this voltage is applied to the voltage controlled resistor it is fed through a summing inverting amplifier comprised of the operational amplifier Z3, resistors R12, R13, R14, R16, and capacitor C3. This is done for three reasons. First the dynamic range of op-amp Z1 is limited by its supply voltages. The summing inverting amplifier reduces the range of possible quiescent operating points for op-amp Z1. Since the voltage on the gate of the JFET transistor Q1 will lie between 0 and 4 volts under normal operating conditions, the output of op-amp Z1 will be forced to lie between 3.33 V and 4.08 V. The range of possible quiescent points for op-amp Z1 is reduced from the range of possible quiescent points of the JFET transistor by a factor K, where K is equal to the DC gain of the inverting summing amplifier. Secondly, the addition of capacitor C2 to the inverting, summing amplifier filters out any AC voltage present at the output of Z1. Finally the 180 degree phase inversion of the inverting summing amplifier allows the use of an N-channel JFET transistor Q1 in the voltage controlled resistor. Resistor R15 and diode D4 protect the gate of the JFET transistor Q1 by never letting the voltage going to the gate be greater than 0.3 V. This protects against the possibility of any forward biased P-N junction effects occuring in the JFET transistor Q1.

The heart of the voltage controlled resistor the N-channel JFET transistor whose drain to source resistance is controlled by its gate voltage must have the signal levels reaching its drain kept as low as possible, for proper operation. This keeps the device in the linear region of operation. High signal levels on the drain cause drain to source resistance modulation which can result in distortion and instability of the negative inductor circuit.

The voltage controlled resistor technique uses the principle of applying a fraction of the voltage appearing on one side of a resistor to its other side to increase its effective resistance. This is resistor R4 in FIG. 1. How far the effective resistance of R4 is increased is determined by the gain of the non-inverting amplifier consisting of the op-amp Z2, resistors R5 through R8 and the JFET transistor Q1. Varying the drain to source resistance of the JFET transistor Q1 varies the gain of the non-inverting amplifier and thus the effective resistance or resistor R4. The overall voltage controlled resistor provides a 180 degree phase shift because as the resistance of the JFET transistor goes up the resistance of the voltage controlled resistor goes down. This is a distinct advantage because if the resistance of the voltage controlled resistor ever becomes greater for AC than it is for DC the negative inductor op-amp breaks into oscillations. Because of the characteristics of the JFET transistor its drain to source resistance can only become greater for AC than DC and never vice versa. This would cause the resistance of the voltage controlled resistor to be greater for DC than AC which is a much less critical error than the other way around. To prevent other differences between the AC and DC resistances of the voltage controlled resistor, a low offset voltage operational amplifier is needed for op-amp Z2. Another advantage of this voltage controlled resistor circuit is that a difference in the AC and DC resistances of the JFET transistor of as much as 1 ohm results in considerably less than 1 ohm of difference between the DC and AC resistance of the voltage controlled resistor.

When the circuit power supplies are first switched on, the resistance of the voltage controlled resistor will be too large and the negative inductor op-amp will try to run for either its positive or negative supply rail. A clipping circuit comprised of op-amp Z4, resistors R9, R10, R11, and diode D3 turns on and applies 0.3 V to the non-inverting terminal of op-amp Z1. This forces op-amp Z1 toward its positive rail. After the voltage at the non-inverting terminal of op-amp Z1 increases beyond 0.3 V the clipping circuit reverse biases diode D3 and it is effectively out of the circuit. The output of op-amp Z1 continues to rise until the resistance of the voltage controlled resistor exactly cancels the value of the negative resistor. This is the quiescent operating point of the circuit. If the resistance of the tertiary winding changes because of a temperature change, the quiescent point of the op-amp Z1 adjusts itself so the positive and negative resistances cancel. The large time constant of capacitor C3, the resistor R13 cause the circuit to power up and respond slowly. However, any changes of coil resistance with temperature are also very slow.

The two elements remaining unmentioned are D1 and D2 which provide transient protection for the electronic circuitry.

Because a transformer whose inductance is multiplied up by a negative inductor has fewer turns than a completely passive equivalent inductance transformer several improvements are obtained besides the reduction in size of the core material and winding area. Fewer turns results in lower leakage inductance which provides better high frequency coupling. Hysteresis losses are minimized providing better coupling and lower power losses. Winding capacitances are also reduced.

What is claimed is:

1. An arrangement for correcting for transformer characteristics comprising in combination: a transformer including a magnetic core, a primary, a secondary and a tertiary winding thereon;

an impedance simulating network comprising; a first operational amplifier having an inverting and a non-inverting input and an output, with first and second means connecting said respective inputs to the terminals of said tertiary winding including feedback circuitry for establishing voltages and currents which affect said transformer as if a negative inductance having a magnitude proportional to the magnetizing inductance of said transformer, and a negative resistance having a magnitude proportional to the resistance of said tertiary winding, a self adjusting positive resistance means, in series with said impedance simulating network, automatically adjustable to a magnitude to effectively cancel the negative resistance equivalent to the degree of increase in resistance of said tertiary winding; and a start-up circuit connected to said first operational amplifier non-inverting input for establishing a voltage thereat such that said first operational amplifier is forced to a condition close to its operating state.

2. An arrangement as claimed in claim 1, wherein said start-up circuit includes:

an other operational amplifier having an inverting and a non-inverting input and an output, resistive means connecting said inverting input and a diode connecting said output of said other operational amplifier to said first amplifier non-inverting input, said non-inverting input of said other operational amplifier connected to an operating potential, said diode poled with its anode connected to said output.

3. An arrangement as claimed in claim 2, wherein said positive resistance means includes a field effect transistor having a gate, a drain and a source electrode with a third means connecting said first operational amplifier output to said gate electrode to thereby control said drain to source resistance.

4. An arrangement as claimed in claim 3, wherein said third means includes a second operational amplifier also having an inverting and a non-inverting input and an output, said inverting input connected to said first operational amplifier output, said non-inverting input connected to a bias potential and fourth means connecting said second operational amplifier output to said gate electrode, and second feedback circuit means operated to sum up any variations in the output of said first operational amplifier thereby providing a comparatively slowly varying output unresponsive to noise impulses.

5. An arrangement as claimed in claim 4, further including a third operational amplifier having an inverting and a non-inverting input and an output, said field effect transistor source connected to a bias potential, and said drain connected to said third operational amplifier inverting input, said first means including a series resistor, with fifth means connecting said third operational amplifier output to the tertiary winding end of said resistor of said first means and sixth means connecting said third operational amplifier non-inverting input to the first operational amplifier end of said first means resistor.

* * * * *